April 8, 1930.   H. C. MOUGEY   1,753,616
PROCESS OF FINISHING SURFACES WITH CELLULOSE NITRATE LACQUERS
Filed July 29, 1925
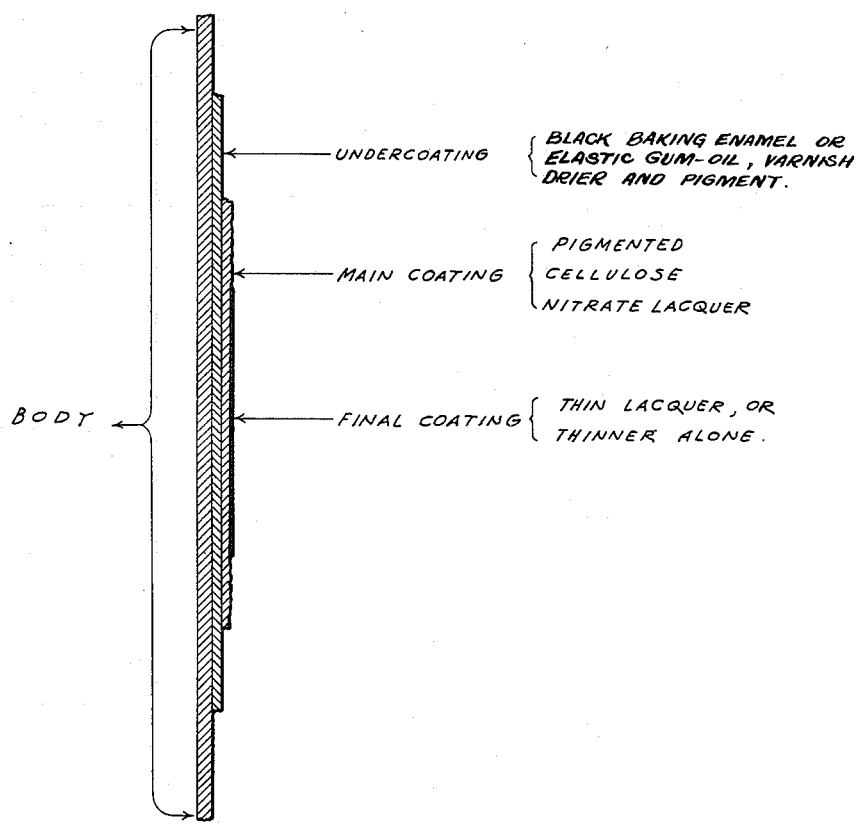
Inventor
Harry C. Mougey
By Spencer, Sewall & Hardman
Attorneys Patented Apr. 8, 1930

1,753,616

UNITED STATES PATENT OFFICE

HARRY C. MOUGEY, OF DAYTON, OHIO, ASSIGNOR TO GENERAL MOTORS RESEARCH CORPORATION, OF DAYTON, OHIO, A CORPORATION OF DELAWARE

PROCESS OF FINISHING SURFACES WITH CELLULOSE NITRATE LACQUERS

Application filed July 29, 1925. Serial No. 46,883.

This invention relates to the art of applying finishing coatings to metallic or other surfaces. It is directed primarily to the application of pigmented cellulose nitrate lacquer or enamel to metallic vehicle bodies, although not limited in application to any particular kind of surface or any particular kind of object to be coated.

The accompanying drawing illustrates the body and the various coatings applied thereto, legends being applied to indicate the specific character of the successive coatings.

Prior to the adoption of cellulose nitrate lacquers or enamels for finishing motor vehicle bodies, either black baking enamel or paint was universally in use for this purpose.

Black baking enamel when applied to vehicle bodies had to be hardened by baking at relatively high temperature in a baking or drying oven. Black baking enamel is in general a varnish in which the black color is due to the presence of black gums rather than to the presence of black pigment. In the manufacture of black baking enamels the gums are combined with linseed oil, China wood oil, or other so called drying oils, and then the mixture of gums and oil is dissolved in turpentine, kerosene, gasoline or similar thinners or mixtures of them.

Paint referred to herein consisted of liquid coating materials comprising pigments, or gums, or both, in combination with drying oil and a certain amount of so-called driers containing lead, manganese and cobalt soaps.

The so-called paint coatings on vehicle bodies comprised, in general, a primer, or first under coat, one or more other under coats of surfacer, one or more main color coats of a suitable pigmented gum varnish or pigmented oil paint applied over the surfacer or other under coat, and a final coat of translucent gum-oil varnish.

The primer consisted of any suitable ground pigment mixed with sufficient oil or varnish to cover the surface, and a drier. The primer was usually covered with a surfacer containing pigment. The main color coating or coatings of paint materials, applied over primer and surfacer, consisted of light colored gums combined with suitable drying oil, such as linseed, the mixture being dissolved in turpentine, or turpentine substitutes, and, in addition, suitable pigments of any desired color ground with the mixture. The final coat of translucent varnish consisted of combinations of gums, drying oils, and suitable thinners, together with driers. In some cases, as on certain smooth metallic surfaces, neither primers nor surfacers were necessary, the coatings described as usually applied over primer and surfacer being applied directly to the body surface. Each of the paint or varnish coatings described was usually finished after it had dried by rubbing with more or less fine abrasives before applying another coat. After the last color coat had been spread, dried and rubbed, the final coat of translucent varnish was applied which was not rubbed. In some cases the rubbing steps and application of the final coat of translucent varnish were omitted, thereby saving in cost by sacrificing excellence of appearance. Four or five color coats were frequently applied, especially where the color coating material was somewhat translucent; each coat was allowed to dry and might or might not be rubbed before the application of another coat; but in some instances one opaque coat served the purpose of several more translucent ones.

Black baking enamels have a disadvantage in that colors other than black cannot be obtained. Moreover, they must be baked at such high temperatures as to practically preclude their use on structures comprising wood.

The chief disadvantage of the use of paints, such as have been herein referred to, was lack of durability; that is, paints applied as described were not resistant to deteriorating influence of the atmosphere and they scratched or marred easily by mechanical contact with hard substances. In addition, the process usually required a long time and large floor space.

Cellulose-nitrate enamels and lacquers do not have to be baked or otherwise force dried, as coating films of this material harden very quickly in air at ordinary temperature. Films produced by spreading these lacquers resist satisfactorily scratching and marring by contact with hard objects and also, when produced from lacquer properly prepared and mixed with the right proportion of pigment, resist the action of the atmosphere. These lacquers may be very quickly applied, according to the method hereinafter described, and surface coatings of them may be brought to a satisfactory luster. Any desired color may be obtained with them.

When cellulose nitrate lacquers were first placed upon the market, they were thought unsatisfactory for motor vehicle body finish, for one reason that they did not adhere permanently to the metallic surface of the bodies furnished by the makers, and when applied over a primer or other undercoat in the same manner as ordinary paint, the thinners of the nitro-cellulose lacquers acted upon the undercoat as a paint and varnish remover acts. Moreover, the lacquer dried so quickly that the surface assumed a condition of roughness commonly known as an orange peel surface; and if this surface was rubbed with sufficiently coarse abrasives to level it, it was difficult to remove the scratches produced by the abrasive by a final polish rubbing.

In accordance with this invention, in order to take advantage of the desirable properties of cellulose nitrate lacquer as an automobile body finish, the metallic surface of a body is first treated in such manner that the lacquer, when applied to it, will hold permanently to said surface. It has been found that metallic surfaces may be treated in two ways to condition them so that cellulose nitrate lacquers will adhere to them:

(1) The surface may be first thoroughly cleaned by any of the known ways of cleaning metals and then may be treated so as to form "teeth" or fine anchoring points upon the metal. These fine anchoring points may be produced by properly sand blasting the metallic surface or by etching by acids or otherwise. Some metal surfaces may be both cleaned and provided with anchoring points by sand blasting or acid etching.

(2) An undercoating may be applied to the metal after it has been properly cleaned. This undercoating may consist of one or more priming coats and one or more surfacing coats. The priming and surfacing coats may be combined in one if desired, or if the surface of the metal is in such condition that one coat will serve the two functions. This undercoating should be of material which, when dried, the thinners of the nitro-cellulose lacquer attack but slightly. As the thinners of the kind of lacquer under discussion are paint and varnish removers, an undercoating should be selected that will be attacked slightly by these thinners but only sufficiently to enable the lacquer to take a good hold upon the undercoating. There are many materials suitable for these undercoatings. One satisfactory material for this purpose is black baking enamel, applied as described, and then rubbed to attain a proper surface, or black baking enamel baked a slightly less degree than usual; others are the commercial primers and surfacers, many of which are suitable for the purpose when carefully dried. A satisfactory primer can be made from a mixture of elastic gum-oil varnish and drier, mixed with a proportion of pigment, such as iron oxide. This should be thoroughly dried, preferably by force drying, such as baking. If a separate surfacer is used, it should contain a larger proportion of pigment than the primer, in order that the latter, in contact with the metal of the vehicle body, may be more elastic than the surfacer. When the undercoating is baked or otherwise force dried for three hours at a temperature of 180° F., more or less, a satisfactory condition of the undercoating may be obtained. The baking or force drying may be effected at temperatures between 100° and 500° F., according to conditions. Application of higher heats, of course, harden the paint coats more rapidly than the lower heats. The completed undercoating or each coat of primer and surfacer may be rubbed to a smooth surface if desired.

A specific example of black baking enamel described generically hereinbefore may be found on page 356 of "German and American Varnish Making," Bottler and Sabin, published by John Wiley & Sons, New York, 1912, under the heading "Black Baking Japan."

A suitable primer or first undercoating is described on page 18 of "Practical Carriage and Wagon Painting," by Hillick, press of Charles H. Webb, Chicago, 1906, for example, No. 3.

A suitable second undercoating or surfacer is described on page 24 of Hillick under the title of "Rough Stuff," No. 1, or in an article beginning on page 388 and ending on page 393, "Technology of Paint and Varnish," Sabin, published by John Wiley & Sons, New York, 1916, under the heading "Rough Stuff."

After the surface has been properly prepared by one or another of the processes described a main color coating of cellulose nitrate lacquer may be applied, preferably with an air gun. This coating may be formed by one application or by several applications at intervals sufficient to allow the film formed by each application to dry. The lacquer used may consist in general of low viscosity cellulose nitrate, gums, softeners, plasticizers, stabilizers, together with the desired kind and quantity of pigment and a suitable quantity of thinner. The lacquer should have sufficient pigment to afford the necessary opacity. It should have a consistency such that it may be spread in a finely divided state and the thinner should be of such composition that the film of lacquer will set properly without either running or hardening too quickly.

By low-viscosity cellulose nitrate, as distinguished from ordinary cellulose nitrate, is meant that variety of cellulose nitrate which, when dissolved in a suitable solvent, such as acetone, will permit the incorporation, in a lacquer, of much larger amounts of cellulose nitrate without obtaining a solution the viscosity of which is too great to permit even spreading with a brush or other suitable instrument. In general from 3½ to 5 times as much low viscosity cellulose nitrate, as ordinary cellulose nitrate, may be used to obtain the same viscosity of the solution.

As the proportion of solvent required in lacquers made with ordinary cellulose nitrate is so much larger than is required in lacquers made with low viscosity cellulose nitrate, one coat of the latter equals in covering capacity several of the former with a consequent saving in time, labor, and solvents.

Opacity is necessary to prevent sunlight from penetrating the lacquer and disintegrating it. The translucent or clear lacquer, when subjected to the actinic rays of sunlight, deteriorates. Pigment added to the lacquer in proper proportions effectively excludes actinic rays and gives good covering capacity of the color desired. Cellulose nitrate lacquers containing sufficient pigment to protect a film from sunlight can be brought to a satisfactory luster by rubbing and polishing; and in this respect they differ from pigmented oil or varnish coating compositions, which can not be polished if they contain sufficient pigment to give them high durability when subjected to sunlight.

The proportion of pigment to total non-volatile ingredients of good cellulose nitrate lacquer is approximately 15 to 40% by weight, depending upon the light-protective properties of the particular pigment employed, and also upon the degree of exposure to light to which the surface to be coated will be subjected. On surfaces that are more or less shaded or protected from sunlight, the proportion of pigment to cellulose nitrate content of the lacquer may be even less.

The main color coating of lacquer, applied as described, may then be rubbed with suitable abrasives for the purpose of obtaining a smooth surface, or if the coating has been formed by several applications, the films deposited by each application may be successively dried and rubbed.

After the surface, covered with pigmented cellulose nitrate lacquer, has been given the final rubbing, it may be treated in either of two ways in order to remove any fine scratches that may have been made by the rubbing operation or any unevenness resulting from other causes:

(1) A final coating of thin lacquer, by preference containing pigment, may be spread upon the rubbed surface.

(2) A coating of thinner alone may be spread upon the rubbed surface.

Wherever the surface to be finished admits, the final coating or film should be of thin lacquer containing pigment of the desired color, because thin clear lacquer does not give maximum durability. When adjoining surfaces have been coated with different colors, thinner alone may be sprayed over the surface, in order to avoid the necessity of masking one color while spraying the other, which would have to be done if thin color lacquer were used for finishing, in order to avoid overlapping of colors. Thinner alone may be used as the final coat to advantage when several bodies of different colors are moved successively, as on a conveyor past the operator, who applies the final coating, since he may spray or otherwise apply the clear thinner without changing the spraying or other tool for applying the finishing coat, as a body of a color different from that of the one that preceded it comes into position. Whether the thin final coating contains pigment or whether it be thin clear lacquer or thinner alone, final rubbing imparts a superior finish.

If several coats of cellulose nitrate lacquer are applied, about fifteen minutes or longer should be allowed between each coat for proper hardening. A longer time should intervene between the last coat and the final rubbing or polishing operation.

As cellulose nitrate lacquers harden so much more rapidly than the paints and varnishes heretofore used for coating automobile bodies it is apparent that a considerable saving of time is made by their use as compared with the use of ordinary paint. The process described, therefore, effects economies of time, space and labor in finishing motor vehicle bodies in addition to providing a finish of good appearance and superior durability. For example, where a period of two weeks was required by certain motor vehicle manufacturers to finish a body by the prior painting process described, the same manufacturers now finish a body with cellulose nitrate lacquer in one and one-half days.

As compared with black baking enamel, cellulose nitrate lacquers have not only the advantage of permitting the use of any color, but also the further advantage that they do not require treatment at high temperatures such as are used in baking black enamel; and as a consequence cellulose nitrate lacquers can be used on vehicle bodies that cannot be subjected to these high temperatures, such as bodies that contain wood in their structures.

By undercoating, as used herein, is meant the coating composed of oil or gum-oil and pigment, whether spread by one application or several and comprising so-called priming or surfacing or priming and surfacing liquid coating compositions.

By main color coating is meant the coating of pigmented lacquer applied to and over the undercoating, whether spread by one or several applications.

By final coating is meant the film of thin pigmented or unpigmented lacquer, or of thinner alone, applied over the main color coating for the purpose of eliminating scratches, orange peel effects, "blushes" or other surface irregularities that would otherwise be visible.

What I claim and desire to secure by Letters Patent is:

1. A process of finishing vehicle body or other surfaces comprising applying thereto an adherent undercoating containing drying oil and pigment, drying said undercoating and applying thereto a main color coating of pigmented cellulose nitrate lacquer; the material of the undercoating and the thinner of the lacquer having such properties that the undercoating, when properly dried, is only slightly softened by the lacquer.

2. A process such as defined in claim 1, in which the undercoating contains drying oil, gum and pigment.

3. A process such as defined in claim 1 in which an additional final coating is applied, the material for producing said final coating comprising a greater proportion of thinner than was used in the material for producing the underlying main color coating of lacquer.

4. A process such as defined in claim 1, in which an additional final lacquer coating is applied, the material for producing said final coating containing a greater proportion of thinner than was used in producing the underlying main color coating of lacquer, together with a suitable proportion of pigment.

5. A process such as defined in claim 1 in which the undercoating is force dried.

6. A process such as defined in claim 1 in which the undercoating is dried by baking at a temperature of 100° F. to 500° F.

7. A vehicle body or the like having thereon an undercoating comprising drying oil and pigment and a main color coating of pigmented cellulose nitrate lacquer adhering to the undercoating, said cellulose nitrate lacquer containing sufficient pigment to render it opaque to the actinic rays of sunlight.

8. A vehicle body or the like as defined in claim 7, in which the undercoating comprises drying oil, gum and pigment.

9. A vehicle body or the like as defined in claim 7, in which the proportion of pigment to total nonvolatile constituents of the lacquer is approximately 15 to 40 per cent by weight.

In testimony whereof I hereto affix my signature.

HARRY C. MOUGEY.